United States Patent [19]

Chen et al.

[11] Patent Number: 5,827,922

[45] Date of Patent: *Oct. 27, 1998

[54] AQUEOUS SILYLATED POLYMER CURABLE COMPOSITIONS WITH TIN CATALYSTS

[75] Inventors: Ming J. Chen, Valley Cottage; Frederick D. Osterholtz, Pleasantville, both of N.Y.

[73] Assignee: OSi Specialties, Inc., Greenwich, Conn.

[ * ] Notice: The term of this patent shall not extend beyond the expiration date of Pat. No. 5,621,038.

[21] Appl. No.: 808,113

[22] Filed: Feb. 28, 1997

Related U.S. Application Data

[63] Continuation-in-part of Ser. No. 452,163, May 19, 1995, Pat. No. 5,621,038.

[51] Int. Cl.$^6$ .................................................. C08L 83/00
[52] U.S. Cl. .......................... 524/837; 524/547; 524/806
[58] Field of Search ..................................... 524/806, 837, 524/547

[56] References Cited

U.S. PATENT DOCUMENTS

| | | |
|---|---|---|
| 3,449,293 | 6/1969 | Burzynski et al. . |
| 3,499,870 | 6/1969 | Hadlock et al. . |
| 3,629,214 | 12/1971 | Buning et al. . |
| 3,706,697 | 12/1972 | Backderf . |
| 3,729,438 | 4/1973 | Plesich et al. . |
| 3,755,252 | 8/1973 | Buning et al. . |
| 3,814,716 | 6/1974 | Plesich et al. . |
| 3,821,174 | 6/1974 | Buning . |
| 4,049,869 | 9/1977 | De Long . |
| 4,062,451 | 12/1977 | Gander . |
| 4,309,326 | 1/1982 | Sage et al. . |
| 4,394,418 | 7/1983 | Temple . |
| 4,399,247 | 8/1983 | Ona et al. . |
| 4,526,930 | 7/1985 | Keogh . |
| 4,684,697 | 8/1987 | Chang et al. . |
| 4,687,818 | 8/1987 | Kawakubo et al. . |
| 4,716,194 | 12/1987 | Walker et al. . |
| 4,719,194 | 1/1988 | Cietek et al. . |
| 4,778,624 | 10/1988 | Ohashi et al. . |
| 4,788,254 | 11/1988 | Kawakubo et al. . |
| 4,818,779 | 4/1989 | Witucki et al. . |
| 4,877,654 | 10/1989 | Wilson . |
| 4,889,747 | 12/1989 | Wilson . |
| 5,017,632 | 5/1991 | Bredow et al. . |
| 5,100,955 | 3/1992 | Pons et al. . |
| 5,196,054 | 3/1993 | Schmuck et al. . |
| 5,226,954 | 7/1993 | Suzuki . |
| 5,385,955 | 1/1995 | Tarshiani et al. . |
| 5,599,597 | 2/1997 | Volkmar et al. . |
| 5,621,038 | 4/1997 | Chen et al. ............................ 524/547 |

FOREIGN PATENT DOCUMENTS

| | | |
|---|---|---|
| 0401496 | 3/1992 | European Pat. Off. . |
| 625502 | 1/1989 | Japan . |

OTHER PUBLICATIONS

Bourne, T.R., Bufkin, B.G., Wildman, G.C., Grawe, J.R.; Feasibility if Using Alkoxysilane–Functional Monomers; Univ. Of Mississippi; 1982.

Lutz, M.A., Polmanteer, K, E.; Methyltrimethoxysilane Modification of Organic Latexes; Dow Corning Corp. May 1979.

*Primary Examiner*—Melvyn I. Marquis
*Attorney, Agent, or Firm*—Edward K. Welch, II; Andrew S. Reiskind; Timothy X. Witkowski

[57] ABSTRACT

Curable composition comprising a stable, water dispersible, curable polymer containing a sterically hindered alkoxylated silane group at 0.1 to 75 weight percent of the total composition; a water dispersible or water soluble, hydrolytically stable organotin catalyst, at 0.1 to 10 weight percent of the total composition; and water at 99.8 to 24.9 weight percent of the total composition are taught herein. These compositions are useful as adhesives, sealants and paints. The compositions have improved properties including solvent resistance, adhesion, hardness, abrasion resistance and mar resistance.

Particular catalysts for use herein include mercaptoalcohol, mercaptide and sulfide forms of diorganotins having either a Sn—S or Sn=S bond, and include dibutyltin dimercaptide and dibutyltin bis(1-thioglycerol).

24 Claims, No Drawings

AQUEOUS SILYLATED POLYMER CURABLE COMPOSITIONS WITH TIN CATALYSTS

This application is a continuation-in-part of prior application Ser. No. 08/452,163, filed May 26,1995, U.S. Pat. No. 5,621,038.

BACKGROUND OF THE INVENTION

Water-curable compositions based on thermoplastic polymers having hydrolyzable silane moieties are becoming increasingly interesting as environmental, health and safety concerns increase for other curing technologies. Such compositions have excellent properties of weather-, chemical- and water-resistance, since the alkoxysilyl group is connected to the polymer chain by a carbon-silicon bond, rather than a labile carbon-oxygen-silicon linkage; therefore water-, alkali- and acid-resistance are remarkably improved compared to a system with silicates or silanes added by physical mixing. One disadvantage of water-curable silylated polymer compositions, however, is that they tend to crosslink, especially if dispersed in water, under normal conditions of preparation, handling and storage. As a result, the relatively poor shelf life of such compositions has tended to limit their wide commercial acceptance and has kept the use of silylated polymers to those with very low silane concentrations, typically less than 1.0 weight percent, in waterborne polymeric products.

Modification of water-curable compositions to alleviate the problem of premature crosslinking is described in U.S. Pat. No. 4,526,930 which teaches relatively water-stable, melt-processable, thermoplastic polymers with hydrolyzable silane moieties. These silylated polymers are only activated or made readily water-curable by the reaction exchanges with an ester group of the silane. Although the titanate functions as a silanol condensation catalyst, it is dispersed in the alkylene-acrylate solid matrix, not in water.

Unexamined Japanese Patent Application No. 6025502 teaches a composition comprising a polymer emulsion obtained by adding a tin catalyst (a diorganotin carboxylate) which is insoluble in water, to silylated vinyl polymers after emulsion polymerization. The addition of a water insoluble tin catalyst, however, is not suitable for such films because defects result from the heterogeneous catalysts and the emulsion polymer mixtures, such as formation of craters and granular particles on the surface and uneven crosslinkage in the film structure. Moreover, the silanes taught therein have alkoxy groups of at least eight carbons long and generally of a straight chain.

This Japanese patent application also teaches non-discriminate curing catalysts generally used for silane/ester hydrolysis and condensation reactions. Similar examples of catalysts for silane ester and silanol-containing compositions can be found in the literature, which disclose catalysts dissolved in organic solvent-based systems to ensure a proper cure.

For example, it has long been known that diorganotin dicarboxylates are catalysts for polymerization of organosilicon compounds. However, in spite of their proven utility, the diorganotin dicarboxylates suffer from several disadvantages. One is the relative instability of the compound as shown by loss of activity upon standing, particularly under moist conditions. The phenomenon is even more pronounced when the catalyst is in the form of an aqueous emulsion. Many tin compounds may also undergo hydrolysis during prolonged storage and revert to catalytically inactive forms.

Thus, it is clear that there is the need for one component, water-based dispersed silylated polymeric systems that have good stability during storage in water and which produce films of good quality upon application and drying.

SUMMARY OF THE INVENTION

The present invention provides compositions and methods of preparing and methods of using water dispersible or emulsifiable, curable polymers having at least one alkoxy silane hydrolyzable group and which clearly meet the challenges of the above problems. The present invention relates to the compositions and methods of making compositions of silylated polymers, curable by organometallic catalysts, and which have good stability during storage in water. These compositions also include a catalyst, water and optionally, some other ingredients. The compositions may be used in coatings, adhesive and sealants. An exemplary use is in fiberglass sizing.

Said compositions have shelf lives of at least twelve months. More preferably, these compositions have shelf lives of at least 24 months.

The curable, aqueous compositions of the present invention comprise: (I) a stable, water dispersible or emulsifiable, curable polymer containing a sterically hindered alkoxylated silane group at 0.1 to 75 weight percent of the total composition; (II) water dispersible or water soluble organometallic catalyst(s), at 0.1 to 10 weight percent of the total composition; (III) water at 99.8 to 24.9 weight percent; and optionally, (IV) other ingredients.

DETAILED DESCRIPTION OF THE INVENTION (I) Polymer

Polymers for use herein are water dispersible or emulsifiable, curable polymers which have pendant and/or terminal silyl ester groups (i.e., alkoxy silane) thereon, where at least some of the pendant and/or terminal silyl ester groups are silanes which are sterically hindered. The steric hindrance of the silyl ester prevents hydrolysis of the silane ester and allows for longer shelf-life. The silane monomer portion of the polymer should be present at 0.1 to 50 mole percent of the monomers used to form the polymer. Varying the amount of silane in the polymer affects the performance properties of the composition.

The polymer may be added to water as an emulsion or dispersion. If the polymer is an emulsion, some amount of emulsifier will be required.

The polymers for use herein include, but are not limited to, vinyls, acrylics, vinyl acrylics, polyurethanes, polyamides, epoxies, polystyrenes, polyesters, vinyl esters, polyolefins, polyethylene, polypropylene and alkyds. Copolymers using at least two different monomers may also be used. The silyl ester group (i.e., $R^3SiR^2_a(OR^1)_{3-a}$) is most commonly attached to the polymer through an alkylene group. The polymers should have molecular weights of between 1,000 and three million.

Illustrative examples of monomeric organofunctional silanes for incorporation into the polymer when free radical addition polymerization is used include acrylatoalkylalkoxysilanes, methacrylatoalkylalkoxysilanes or vinyl alkoxysilane monomers, such as 3-methacryloxypropyltri-iso-propoxysilane, 3-methacryloxypropyltri-iso-butoxysilane, 3-methacryloxypropyltrioctoxysilane, vinyltri-iso-butoxysilane, vinyl tri-n-decoxysilane and vinyltri-tertbutoxysilane. Other polymerizable silanes, such as maleates, may be used. Silyl-terminated polymers are formed by reacting chain transfer agents, such as 3-mercaptopropyl tri-iso-butoxysilane trimethoxysilane.

Illustrative examples of monomeric organofunctional silanes for incorporation into the polymer when the polymer is formed by condensation polymerization include 3-aminopropyltri-iso-propoxy silane, N-(2-aminoethyl)-3-amino propyldi-iso-butoxy silane, 4-mercaptobutyldimethyloctyloxysilane, 3-isocyanatopropyltri-sec-butoxysilane, and 3-glycidoxypropylmethyldipentoxysilane. Polymers that are formed by condensation polymerization include polyurethanes, epoxies, polyesters, vinyl esters, polyureas, polyamides and similar types of polymers.

The silanes may be grafted or end-capped onto an existing polymer or may be a co-monomer in the production of the polymer.

Further, the pendant and/or terminal silane group of the polymer may be represented by the structure $R^2_a(R^1O)_{3-a}SiR^3$ where $R^1$ is a sterically hindered $C_3$ to $C_{10}$ alkyl group in straight or branched chain configuration; $R^2$ is a monovalent hydrocarbon group having from one to ten carbon atoms; $R^3$ is an alkylene, arylene, aryalkylene group or the polymer backbone itself, with the proviso that the $SiR^3$ is bound to the polymer through an Si—C bond; and "a" has a value of zero, one or two.

Illustrative of suitable sterically-hindered, straight chain hydrocarbon radicals for use as $R^1$ in the formula set forth above are n-butyl, n-pentyl n-hexyl, n-heptyl, n-octyl, n-nonyl, n-decyl and the like, and cyclo-radicals such as cyclopentyl, cyclohexyl, cycloheptyl, cyclooctyl, bicycloheptyl, and the like. Illustrative of suitable branched chain hydrocarbon radicals for $R^1$ are alkyl radicals such as iso-octyl, 1-ethyl, 3-methyl pentyl, 1,5 di-methyl hexyl, 4-methyl-2-pentyl and the like. The most preferable $R^1$ are sterically hindered groups of less than five carbons, and more preferably less than four carbons, such as isopropyl, secbutyl, iso-butyl and sec-amyl.

$R^2$ is a monovalent hydrocarbon having from one to ten carbon atoms, for example, an alkyl group (e.g., methyl, ethyl, propyl, octyl or decyl) or an aryl group (e.g., phenyl, benzyl or tolyl). $R^3$ is the group that links the silane pendant or terminal group to the polymeric backbone and may be a straight or branched alkyl group, arylalkyl group or aryl group, generally has about from 1 to 18 carbons and may have substituents thereon or may be the polymer itself. The silicon atom is bound to the polymer through a silicon carbon bond, on $R^3$, which provides hydrolytic and thermal stability to the silylated polymer. Substituents to the $R^3$ group may include a replacement for a carbon atom with atoms such as oxygen, nitrogen or sulfur, with the proviso that the carbon atom adjacent to the silicon is not replaced. Other substituents include replacement of the hydrogen atom attached to carbon with halogen atoms, nitrogen, sulfur, oxygen, and organofunctional groups, such as cyano, urea, esters, amides, oxo and the like.

The polymers may be prepared by any polymerization technique known in the art, such as, suspension polymerization, interfacial polymerization, solution polymerization or emulsion polymerization. Emulsion polymerization of ethylenically unsaturated monomers in the presence of certain surfactants is the preferred polymerization technique for vinyl and acrylic polymers because the aqueous dispersion of latex polymer particles so formed can be used directly or with minimal work-up in preparing the aqueous compositions of the present invention. These polymerizations may be conducted as is well known in the art.

Polymers suitable for dispersing in water usually incorporate solubilizing groups, such as nonionic, anionic, or cationic groups. Nonionic groups include amino, hydroxyl, carboxyl, polyalkylene oxide and the like. Anionic groups include salts of sulfates, phosphates, carboxylates and the like. Cationic groups include protonated amines, quaternary ammonium salts and the like. Combinations of the above solubilizing groups of nonionic with either cationic or anionic groups may be used. Polymer dispersions may be prepared by techniques well known in the art.

Emulsions of polymers that contain a silyl group with sterically hindered alkoxy groups can be prepared by using emulsifiers and techniques well known in the art. The emulsifiers for use herein include nonionic, anionic and cationic surfactants or mixtures of nonionic with anionic or cationic surfactants. Examples of the nonionic surfactants include polyoxyethylene alkyl ethers, polyoxyethylene alkyl phenyl ethers, polyoxyethylene fatty acid esters, sorbitan fatty acid esters, and polyoxyethylene sorbitan fatty acid esters. Examples of the anionic surfactants include fatty acid salts, alkyl sulfate ester salts, alkyl benzene sulfonate, alkyl phosphate, alkylallyl sulfate ester salt, and polyoxyethylene alkylphosphate ester. Examples of the cationic surfactants include quaternary ammonium salts such as long chain alkyl trimethylammonium salts, long chain alkyl benzyl dimethyl ammonium salts, and di(long chain alkyl) dimethyl ammonium salts. A further listing of surfactants useful in the present invention may be those described in 1994 McCutcheon's *Vol. 1: Emulsifiers and Detergents*, North American Edition (The Manufacturing Confectioner Publishing Co., Glen Rock) 1994, which is incorporated herein by reference.

The emulsifier(s) should be present in the range of 0.05 to 30 weight percent based on weight of polymer and preferably 0.2 to 20 weight percent of the polymer composition.

The appropriate HLB (hydrophilic-lipophilic balance) of the surfactants is chosen to correspond to the HLB of the specific silylated polymer being emulsified. The method for selecting the optimum HLB for a substance is well known to one skilled in the art and described in "The HLB System" by ICI Americas Inc.

The stable, water dispersible or emulsifiable, curable polymer containing a sterically hindered alkoxylated silane group should be present at 0.1 to 75 percent by weight of the total composition.

(III) Catalyst

The present invention solves the problems of the prior art by using water soluble or emulsifiable curing catalysts, not previously used with aqueous compositions of silylated polymers, to cure such polymers. Suitable catalysts for use herein are hydrolytically stable, water emulsifiable or water soluble organometallic catalysts, such as hydrolytically stable organotitanate, organotin, chelated titanium, aluminum and zirconium compounds, and combinations thereof.

Hydrolytically stable means that the organometallic catalyst is sufficiently stable in the presence of water at a pH between 5.5 and 8.5 such that less than 50 percent of the organometallic catalyst loses its catalytic activity in a period of twelve months. The catalytic activity of the organometallic catalyst is lost due to the disassociation of the covalently bonded and/or coordinately bonded ligand(s) into the water which results in the catalyst precipitating from solution or forming inactive metallic species, such as metallic oxides.

Water soluble means having a solubility of greater than 2 weight percent of water at room temperature. It is noted that water emulsifiable catalysts will require the addition of an emulsifier. The emulsifiers and method of emulsion preparation are the same as those described for emulsifying the polymer with the proviso that the emulsifiers used to make emulsions of the catalysts are compatible with the emulsifiers used to make emulsions of the polymer. In some contexts, water soluble catalysts are preferred over water emulsifiable catalysts where it would be possible that the emulsifiable catalysts would settle during standing and affect the cure and properties of the composition. However, water emulsifiable catalysts are useful as well, when they are employed with effective emulsifiers.

The general structure of the organometallic catalysts for use herein is represented by :$R^4_b ML_c$ where M is a transition metal ion, such as titanium, tin, aluminum or zirconium, $R^4$ is a monovalent hydrocarbon group having from one to ten carbon atoms; L may each be the same or different and are ligands that are covalently or coordinately bonded to the metal ion; b has a value of zero to four; and c has a value of one to six, with the proviso that b+c is between two and six.

Exemplary $R^4$ are alkyls (e.g., methyl, ethyl, octyl or decyl), aryls (e.g., phenyl or napthyl), substituted aryls (e.g., chlorophenyl, tolyl or cyanophenyl) or aralkyls (e.g., benzyl or phenylethyl). Exemplary L's are sulfur, mercaptides, water, hydroxyl, ammonia, amide or preferably a heteroatom unsubstituted alkylene, arylene or aralkylene group having from one to twenty carbons which have substituents thereon and may have heteroatoms such as oxygen, nitrogen or sulfur. The substituents include halogens, nitrogen, sulfur, oxygen, cyano, urea, ester, amide, and similar groups. L may contain more than one heteroatom capable of covalently bonding with the metal ion.

The general structure of titanate chelates for use herein are represented by

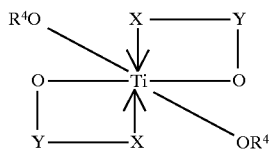

in which X represents a functional group containing oxygen or nitrogen, and Y represents a an alkyl chain having from 1 to 10 carbons and $R^4$ represents a hydrogen or an alkyl, aryl or aralkyl group having from 1 to 10 carbons.

Examples of soluble chelated titanates and aqueous chelated titanates are dihydroxy bis [2-hydroxypropanato (2-)-$O^1,O^2$] titanate, mixed titanium ortho ester complexes, acetylacetonate chelate, bis(ethyl-3-oxobutanolato-$O^1,O^3$) bis(2-propanolato) titanium, and alkanolamine complex of titanium. Other hydrolytically stable titanium catalysts are listed in Feld et al., "The Chemistry of Titanium" (1965). Preferred catalysts are TYZOR®1 31, TYZOR LA, and TYZOR 101 commercially available from DuPont de Nemours & Co.

Emulsifiable, hydrolytically-stable, organotin catalysts are also useful for this invention. Examples of such are mercaptoalcohol, mercaptide or sulfide form of diorganotin having a Sn—S or Sn=S bond. Further, illustrative examples are $R_2Sn(SCOO)$ type compound, such as $(n-C_4H_9)_2Sn(SCH_2COO)$; $R_2Sn(SS)$ type compound, such as $(n-C_8H_{17})_2Sn(SCH_2COOCH_2CH_2OCOCH_2S)$; $R_2Sn(SCH_2COOR)_2$ type compound, such as $(n-C_4H_9)_2Sn(SCH_2COOC_8H_{17}\text{-iso})_2$; $RSn(SCH_2COOR)_3$ type compound, such as $(n-C_4H_9)Sn(SCH_2COOC_8H_{17}\text{-iso})_3$; $R_2Sn=S$ compound, such as $(n-C_8H_{17})_2Sn=S$ or the like; and

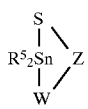

where $R^5$=1–8 carbon atoms alkyl or aryl; W=—S— or —O—; and Z=—$CH_2CH(CH_2OH)$— or—$CH_2CH(OH)CH_2$—. Preferred examples are FOMREZ UL-1, UL-22, and UL-32 from Witco and dibutyltin bis(1-thioglycerol), dibutyltin oxide and dibutyltin dimercaptide.

The catalyst should be present at a level of at least 0.1 percent by weight of the total composition. Less than 0.1 percent of the catalytic metal usually produces no significant effect on the reaction. Generally speaking, the catalyst can be used in an amount of 0.1 to 20 percent by weight, preferably 0.1 to 10 percent by weight, for cost considerations and color integrity of the polymer.

(III) Water

Water should be present at 99.8 to 24.9 weight percent of the composition. Water may be added to either (I) or (II) before combining components (I) and (II).

(IV) Other Ingredients

The preferred pH range of the present aqueous compositions is about 5.5 to 8.5, with most preferred being 7.0. Thus, it may be appropriate that the aqueous dispersion also contain a small amount of a buffer. Any conventional buffering agent or mixtures of such agents known in the art can be employed, such as sodium acetate and sodium bicarbonate. The buffer, if present, should be about 1.0 parts by weight or less based on 100 parts by weight of polymer. Silylated acrylic latex generally will not contain a buffer, whereas silylated vinyl acrylic latex generally will contain buffer.

Furthermore, the compositions of the present invention may include an appropriate amount of thickeners (such as carboxymethylcellulose, methylcellulose, hydroxyethylcellulose, polyvinyl alcohol, polyacrylic acid), fillers, pigments, dyes, heat-stabilizing agents, preservatives, and penetrants (such as aqueous ammonia) and other common additives. In addition, commercially available water-based polymer dispersions can be blended with the water-dispersible compositions of the present invention, provided that they do not cause instability. Examples include conventionally known waterborne acrylics, cellulosics, aminoplasts, urethanes, polyesters, alkyds, epoxy systems, silicones or mixtures thereof.

Nonionic, anionic or cationic surfactants having a hydrophilic lipophilic balance (HLB) in a range suitable to emulsify the catalyst and/or polymer may also be used herein. The optional ingredients may be added at any time, although in most cases, the catalyst should be added last.

METHOD OF MANUFACTURE

The compositions of the present invention are prepared by adding the catalysts to the silylated polymer dispersion or emulsion. The method employed to mix these components is not critical and any commonly used low shear equipment, such as a blade or paddle mixer, is suitable.

USE/ADVANTAGE

The compositions do not seed or gel over an twelve month period of room temperature storage. More preferably compositions have a shelf life of at least twenty-four months.

The compositions of the present invention are intended to be cured upon use. They may be cured at a range of temperatures, including ambient cure or elevated temperature cure. Such curing may be accomplished by standard means in the art.

It is possible to use the compositions for various purposes, e.g., paints, adhesives, coating materials, binders and sealants, and take advantage of the above excellent characteristics of compositions of the present invention. The cured compositions form a coating having excellent gloss, solvent resistance, adhesion, hardness, abrasion resistance and mar resistance. The compositions of this invention are film forming and are useful for forming protective and/or water repellent coatings on a variety of substrates, such as metal, wood, textiles, leather, and ceramics. A composition according to the present invention, depending on the presence of pigments or other conventional components, may be used as a basecoat, clearcoat, print paste binder, sizing, coating or primer. Cured films having superior transparency and solvent resistance may be formed with no surface defects. Washing resistant coatings may be created.

MEK double rub tests, gel content and NMP paint adhesion tests of the latex films illustrate the enhanced siloxane crosslinking effected by the organotin catalysts used in the present invention. Cured compositions made according to the present invention have an MEK rub resistance (performed according to ASTM D 4752-87) of at least 20, preferably at least 40 and more preferably at least 60 after curing under mild conditions and for short periods of time. The MEK rub resistance of compositions of the present invention cured under higher temperature conditions, such as at 121° C., are at least 40 and more preferably at least 60. The cured compositions have improved adhesion performed according to the NMP procedure described in Sabata, et al., *Journal of Adhesion Science and Technology*, 7 (11), 1153–1170 (1993), which is incorporated herein by reference, of at least ten minutes and preferably at least twenty minutes.

EXAMPLES

The following Examples are given to facilitate the understanding of this invention without any intention of limiting the invention thereto. All parts in these Examples are by weight.

Examples 1–18 and Comparative Examples I–VIII. Preparation of Silylated Polymer

The preparation of a vinyl acrylic latex containing 3-methacryloxypropyltriisopropoxysilane, Silane A, as a co-monomer is presented. The mole ratio of vinyl acetate/ butyl acrylate/ silane monomers was 86.3/9.8/3.9, respectively. The latex was produced by a semicontinuous batch process. 419.5 parts of deionized water, 26.5 parts of Igepal CA-897, 3 parts Igepal CA-630, 2 parts of sodium bicarbonate and 2.5 parts of Natrosol 250 MXR were charged into a one liter reactor equipped with an overhead condenser and a metal-bladed stirrer. The system was heated to 65° C. with a heating mantle and purged with nitrogen. Then, 1.8 parts of ammonium persulfate and 3.6 parts of Alipal EP-110 were added. Ten percent of the monomer mixture (prepared by pre-mixing 385 parts of vinyl acetate, 65 parts of butylacrylate and 66 parts or 4 mole % of 3-methacryloxypropyltriisopropoxysilane was then added in less than 1 minute. The temperature was maintained below 75° C. After the addition, the reaction was allowed to continue for another 15 minutes. The stirring rate was kept constant at 150 rpm. After the seed latex was made by this batch process, the remaining 90% of the monomer mixture was added over a three hour period at a rate that permitted the heat of reaction to be removed and the reaction temperature maintained at 75° C. When the monomer mixture had been completely added, the emulsion was held at 75° C. for 30 minutes and 0.1 part of t-butyl hydroperoxide-70 was added. 25 parts of 2% sodium formaldehyde sulfoxylate was added over a period of one hour while maintaining the temperature at 75° C. After completion of the reaction, the pH of the reaction solution was adjusted to 7.5 by adding a 5% ammonia solution.

The procedure for the synthesis of a vinyl acrylic latex containing 3-methacryloxypropyltriisopropoxysilane (A) was repeated using different silane monomers. These silane monomers were, 3-methacryloxypropyltri-iso-butoxysilane (B), 3-methacryloxypropyltrioctoxysilane (C), vinyltriisobutoxysilane (D), and vinyltri-tert-butoxysilane (E). The quantity of silane monomers used was varied. In these examples, silane concentrations ranging from 0.17 to 4 mole percent were employed using a homogeneous process (seeding polymers followed by starved monomers feeding), core-shell technology, or delayed-silane monomer addition at the last 10% of polymerization. Solid contents were in the range of 44% to 56%. The particle sizes were in the range of 0.1 to 1 μm. The amount of each monomer used to prepare the silylated polymers are given in Table I.

As a comparison, these procedures were repeated for synthesis of emulsion polymers containing 3-methacryloxypropyltrimethoxysilane (X), vinyltriethoxysilane (Y) and no silane. The silylated polymers which contained 4 mole percent Silane X gelled during preparation.

The silylated polymer containing three weight percent of Silane Y gave a latex with a viscosity of 740 cp. When the concentration of Silane Y was raised to 7.7 wt % of the polymers, the latex gave high viscosity (5800 cp.) and gelled after 1 week storage at ambient condition. The amounts of each monomer used to prepare the polymers used as a comparative examples are set forth in Table I below.

TABLE I

The weight and mole percent of monomers used to prepare silylated polymer emulsions of present invention and comparative examples.

| Example No. | Silane | Weight % | Mole % | Vinyl Acetate Weight % | Vinyl Acetate Mole % | Butyl Acrylate Weight % | Butyl Acrylate Mole % |
|---|---|---|---|---|---|---|---|
| 1 | A | 12.8 | 3.9 | 74.6 | 86.3 | 12.6 | 9.8 |
| 2 | A | 1.5 | 0.40 | 84.6 | 89.7 | 13.9 | 9.9 |
| 3 | A | 1.0 | 0.27 | 85.0 | 89.8 | 14.0 | 9.9 |
| 4 | A | 10.0 | 2.85 | 85.0 | 93.5 | 5.0 | 3.7 |
| 5 | B | 14.3 | 3.9 | 73.3 | 86.3 | 12.4 | 9.8 |

TABLE I-continued

The weight and mole percent of monomers used to prepare silylated polymer emulsions of present invention and comparative examples.

| | | | | | | | |
|---|---|---|---|---|---|---|---|
| 6 | B | 1.63 | 0.40 | 84.5 | 89.7 | 13.9 | 9.9 |
| 7 | B | 1.0 | 0.24 | 85.0 | 89.8 | 14.0 | 9.9 |
| 8 | B | 10.0 | 2.53 | 85.0 | 93.8 | 5.0 | 3.7 |
| 9 | C | 19.6 | 3.9 | 68.8 | 86.3 | 11.6 | 9.8 |
| 10 | C | 2.4 | 0.40 | 83.9 | 89.7 | 13.7 | 9.9 |
| 11 | C | 1.0 | 0.17 | 85.0 | 89.9 | 14.0 | 9.9 |
| 12 | C | 10.0 | 1.65 | 85.0 | 88.5 | 5.0 | 9.8 |
| 13 | D | 11.0 | 3.9 | 76.2 | 86.3 | 12.8 | 9.8 |
| 14 | D | 1.2 | 0.4 | 84.9 | 89.7 | 13.9 | 9.9 |
| 15 | D | 10.0 | 3.2 | 85.0 | 87.1 | 5.0 | 9.7 |
| 16 | E | 11.0 | 3.9 | 76.2 | 86.3 | 12.8 | 9.8 |
| 17 | E | 1.2 | 0.4 | 84.9 | 89.7 | 13.9 | 9.9 |
| 18 | E | 10.0 | 3.2 | 85.0 | 87.1 | 5.0 | 9.7 |

| Comparative | | | | Vinyl Acetate | | Butyl Acrylate | | % Polymer |
|---|---|---|---|---|---|---|---|---|
| No. | Silane | Weight % | Mole % | Weight % | Mole % | Weight % | Mole % | in emulsion |
| I | X | 10.0 | 3.9 | 77.0 | 86.3 | 13.0 | 9.8 | 50.2 |
| II | X | 1.1 | 0.4 | 85.0 | 89.7 | 13.9 | 9.9 | 50.2 |
| III | X | 1.0 | 0.37 | 85.0 | 89.7 | 14.0 | 9.9 | 50.0 |
| IV | X | 10.0 | 3.5 | 85.0 | 86.8 | 5.0 | 9.7 | 50.0 |
| V | Y | 7.9 | 3.9 | 78.8 | 86.3 | 13.3 | 9.8 | 50.2 |
| VI | Y | 0.84 | 0.4 | 85.2 | 89.7 | 14.0 | 9.9 | 50.2 |
| VII | Y | 15.4 | 8.0 | 71.7 | 82.1 | 12.9 | 9.9 | 50.2 |
| VIII | none | 0.0 | 0.0 | 85.0 | 90.0 | 15.0 | 10.0 | 50.0 |

Examples 19–31

Shelf Stability of Compositions

The shelf life stabilities of the water borne polymers containing the sterically hindered alkoxy groups in the presence of the curing catalysts were determined by composition viscosity and $^{29}Si$ NMR spectroscopy. The catalysts of the present invention were added to the silylated polymer emulsions of the present invention that were described in Table I, and mixed for five minutes with a paddle. The types and amounts (weight percent) of catalysts that were added to the silylated polymer emulsions are repeated in Tables II and III. The viscosities, reported in centipoise (cp), were determined for the compositions using a Brookfield viscometer, #3 spindle, according to ASTM D 2196-86.

Examples 19–28, reported in Table II, experienced only a slight increase in viscosity over a two month period. For example, silylated polymer emulsion described in Example 9 and in the presence of five weight percent TYZOR 131 catalyst only increased the viscosity from 960 to 1060 cp after storage at room temperature for two months. (Example 21). When silylated polymer emulsions were prepared using high levels of alkoxysilyl groups which are not sterically hindered, the compositions gelled within short periods of time (i.e., one week) after preparation, even when there were no curing catalysts present (as shown in Comparative Examples XI–XIII). The emulsions of polymers containing sterically hindered alkoxysilyl groups are stable in the absence of a curing catalyst, as shown in Comparative Examples IX and X.

The stability of the emulsions of polymers containing sterically hindered alkoxysilyl groups in the presence of the curing catalysts of the present invention were also determined using $^{29}Si$ spectroscopy. This technique directly measures the amount of cure that is occurring in the compositions by measuring the amounts of silyl ester groups [—Si$(OR)_3$] that have and have not undergone any crosslinking or curing reaction. Examples 29–31, as indicated in Table III below, show that the silyl ester group has not undergone any curing and therefore makes up 100% of the silicon species present after storage for greater than 40 days at room temperature. When no curing catalysts were present, the emulsions of the prior art were stable, as indicated in Comparative Examples XIV–XVI.

TABLE II

Viscosity of silylated polymer in the absence and presence of catalysts

| Example No. | Emulsion Example | Catalyst,Weight % | 0 mo. | 2 mo. | 3 mo. | 6 mo. |
|---|---|---|---|---|---|---|
| 19 | 1 | TYZOR 131, 5 | 100 | 140 | — | — |
| 20 | 5 | TYZOR 131, 5 | 200 | 280 | — | — |
| 21 | 9 | TYZOR 131, 5 | 960 | 1060 | — | — |
| 22 | 13 | TYZOR 131, 5 | 580 | 840 | — | — |
| 23 | 16 | TYZOR 131, 5 | 1500 | 1700 | — | — |
| 24 | 2 | TYZOR 131, 1 | 1660 | 1800 | — | — |
| 25 | 6 | TYZOR 131, 1 | 1180 | 1100 | — | — |
| 26 | 10 | TYZOR 131, 1 | 760 | 1060 | — | — |
| 27 | 14 | TYZOR 131, 1 | 1520 | 1800 | — | — |
| 28 | 17 | TYZOR 131, 1 | 1140 | 1340 | — | — |

TABLE II-continued

Viscosity of silylated polymer in the absence and presence of catalysts

| Example No. | Emulsion Example | Catalyst,Weight % | 0 mo. | 2 mo. | 3 mo. | 6 mo. |
|---|---|---|---|---|---|---|
| IX | 13 | None, 0 | 1140 | — | 1180 | — |
| X | 14 | None, 0 | 2210 | — | — | 2020 |
| XI | I | None, 0 | gelled | | | |
| XII | IV | None, 0 | gelled | | | |
| XIII | VII | None, 0 | gelled | | | |

TABLE III $^{29}$Si NMR analysis of silylated polymer emulsions and comparative examples

| Example No. | Emulsion from Example | Catalyst, % | Time (days) | Polymer Si(OR)$_3$ Mol % |
|---|---|---|---|---|
| 29 | 8 | TYZOR 131, 5 | 41 | 100 |
| 30 | 12 | TYZOR 131, 5 | 52 | 100 |
| 31 | 15 | TYZOR 131, 5 | 47 | 100 |
| XIV | 8 | None | 120 | 100 |
| XV | 12 | None | 210 | 100 |
| XVI | 15 | None | 120 | 100 |

Polymer-Si(OR)$_3$ represents the amount of silyl ester that has not reacted to form siloxane bonds or crosslinks (Si—O—Si)

TABLE IV

Gel content of films cast from silylated polymer emulsions in the presence and absence of curing catalysts.

| Example No. | Emulsion Example No. | Catalysts, % | Gel Content, % |
|---|---|---|---|
| 32 | 1 | TYZOR 131, 5 | 25.4[1] |
| 33 | 5 | TYZOR 131, 5 | 75.6[1] |
| 34 | 9 | TYZOR 131, 5 | 78.3[1] |
| 35 | 13 | TYZOR 131, 5 | 53.1[1] |
| 36 | 16 | TYZOR 131, 5 | 0[1] |
| XVII | 1 | None | 13.1[2] |
| XVIII | 5 | None | 49.9[2] |
| XIX | 9 | None | 69.7[2] |
| XX | 13 | None | 23.8[2] |
| XXI | 16 | None | 0.9[2] |

[1]Cured at room temperature for 10 days
[2]Cured at room temperature for 10 weeks

Examples 32–36
Gel Content of Cured Compositions

The effectiveness of the curing catalysts in promoting the crosslinking of the polymer containing sterically hindered alkoxysilyl groups is demonstrated by the gel content of films. The gel content was determined by pouring compositions of the present invention or comparative examples into a petri dish and allowing them to cure at room temperature for either ten days or ten weeks. One gram of the dried (cured) film was removed and divided into small rectangular pieces which were weighed ($w_1$), placed into a cellulosic thimble and extracted with methyl ethyl ketone (MEK) solvent for twelve hours under nitrogen atmosphere using a Soxhlet extractor. After extraction, the sample remaining in the thimble was dried and the remaining sample was weighed ($w_2$). The gel content was determined by the equation: Gel content (%)=[($W_1-w_2$)/$w_1$]×100, where $w_1$ and $w_2$ are as above. The data given in Table IV shows that the gel content of the polymers containing sterically hindered alkoxysilyl groups was significantly higher when cured in the presence of the catalysts (Examples 32–35) than when cured in the absence of catalyst (Comparative Examples XVII–XX). For example, the polymer described in Example 5 gave gel contents of 75.6 and 49.9 percent when cured in the presence of 5 percent TYZOR 131 and absence of catalyst, respectively. Even long curing times, such as ten weeks at room temperature, did not yield the same high level of cure. The tert-butoxy silyl group of polymer 16 was so sterically hindered that it did not cure even in the presence of the curing catalyst. A comparative polymer containing no silane, such as a polymer described in Comparative Example VIII did not crosslink even when allowed to stand for ten weeks. The gel content of dried polymer VIII was zero percent.

Examples 37–42
Film Quality

The film quality or appearance is highly dependent upon the selection of the curing catalysts. For example, the water soluble catalyst in Examples 37–38 or emulsified catalyst of the present invention in Examples 39–42, when used in combination with the emulsions of polymers containing sterically hindered alkoxysilyl groups, gave cured films that were smooth and free of surface defects.

The catalyst emulsions were prepared by emulsifying an organotin catalyst with a compatible emulsifier so that a stable emulsion which is readily dispersible in aqueous systems is formed. Examples of catalyst emulsions are Elf Atochem PE-1013, Witco FOMREZ UL-1, FOMREZ UL-22 and UL-32. To five grams each of the liquid catalysts, 7.1 grams of IGEPAL CA-987 was added followed by an additional 7.9 grams of double distilled water. The mixture was stirred vigorously for about thirty minutes. The PE-1013 resulted in a stable microemulsion. FOMREZ UL-1, UL-22 and UL-32 formed emulsions which were stable.

Films were prepared by casting them using a draw down bar onto phosphated stainless steel panels. The dry film thickness was 2 mils [50.8 µm]. The films were cured at 23° C. and 50% relative humidity for seven days.

When catalysts which have been commonly used to cure solvent based or neat polymers containing silyl groups, such as dialkyl tin carboxylates, amines or titanate esters, are employed in waterborne dispersion polymer systems the cured film contains many surface defects, as shown in Comparative Examples XXIII–XXVII in Table V. These examples illustrate the importance of selecting the curing catalyst from the groups described in the present invention to achieve films of uniform cure and free of defects.

The utility of the compositions of the present invention is shown by the improvement in solvent resistance and adhesion of cured compositions. The solvent resistance was determined in MEK double rubs, as described in ASTM D 4752-87. The films were cured either by baking or drying. The baking conditions were 121° C. for twenty minutes followed by seven days at 23° C. and 50% relative humidity. The data given in Table VI show that the amount of catalyst of the present invention is important to the solvent resistance of the cured film. Films of polymers containing sterically hindered alkoxysilyl groups and no catalysts gave MEK double rubs of only 12 to 22, as shown in Comparative Examples XXXV–XXXVIII. If the polymer contains no silyl groups, the solvent resistance is very poor, giving only 5 to 9 MEK double rubs.

The films cast from emulsions of polymers containing sterically hindered alkoxysilyl groups and catalysts of the present invention gave good solvent resistance. Moreover, the solvent resistance is very good, provided that the catalyst concentration is not too low. For example, films cast from compositions of the present invention where the concentration of the catalyst was 0.5 percent or higher gave MEK double rubs of between 21 and 128, whether the films were cured by either the bake or air-dried method as shown in Examples 45 to 50, and 53 to 86. At low catalyst concentrations (such as 0.05 percent) the films lost some of their solvent resistance, as shown in Examples 43, 44, 51 and 52. Aging the compositions of the present invention for extended shelf lives was not deleterious to the solvent resistance characteristics of cured films. For example, compositions aged for periods of two to eight weeks before casting films gave solvent resistance that was equal to or better than films cast down from compositions freshly made, as shown in Examples 59 to 78.

TABLE V

Coating film quality of silylated polymer emulsion cured in the presence of water soluble or dispersible catalyst of present invention and comparative examples

| Example No. | Emulsion Example No. | Catalyst, % | Film Quality |
|---|---|---|---|
| 37 | 9 | TYZOR 131, 5 | Smooth film no defects |
| 38 | 9 | TYZOR LA, 5 | Smooth film no defects |
| 39 | 9 | PE-1013, 1 | Smooth film no defects |
| 40 | 9 | FOMREZ UL-1, 1 | Smooth film no defects |
| 41 | 9 | FOMREZ UL-22, 1 | Smooth film no defects |
| 42 | 9 | FOMREZ UL-32, 1 | Smooth film no defects |
| XXII | 9 | Dibutyl maleate, 1 | White granular particles |
| XXIII | 9 | Dibutyl tin dilaurate, 1 | Craters in film |
| XXIV | 9 | Dibutyl tin diacetate, 1 | Large craters in film |
| XXV | 9 | TYZOR GBA, 5 | Crater and discolored film |
| XXVI | 9 | 4,4[1] (oxydi-2,1-ethanediyl) bis morpholine, 1 | Gel particles in film |
| XXVII | 9 | None | Smooth film, no effects |

[1]Cured at 23° C. and 50 percent relative humidity for 7 days.

TABLE VI

The solvent resistance of cured films of silylated polymer as determined by methyl ethyl ketone double rubs.

| Example No. | Polymer Emulsion | Catalyst, % | Cure type | Age of Compos. B/f Cure (wks) | MEK Dble Rubs |
|---|---|---|---|---|---|
| 43 | 5 | TYZOR 131, 0.05 | Baked | 0 | 11 |
| 44 | 5 | TYZOR 131, 0.05 | Dried | 0 | 18 |
| 45 | 5 | TYZOR 131, 0.5 | Baked | 0 | 31 |
| 46 | 5 | TYZOR 131, 0.5 | Dried | 0 | 47 |
| 47 | 5 | TYZOR 131, 1.0 | Baked | 0 | 37 |
| 48 | 5 | TYZOR 131, 1.0 | Dried | 0 | 47 |
| 49 | 5 | TYZOR 131, 2.0 | Baked | 0 | 41 |
| 50 | 5 | TYZOR 131, 2.0 | Dried | 0 | 50 |
| 51 | 5 | TYZOR LA, 0.05 | Baked | 0 | 11 |
| 52 | 5 | TYZOR LA, 0.05 | Dried | 0 | 15 |
| 53 | 5 | TYZOR LA, 0.5 | Baked | 0 | 21 |
| 54 | 5 | TYZOR LA, 0.5 | Dried | 0 | 30 |
| 55 | 5 | TYZOR LA, 0.5 | Baked | 0 | 41 |
| 56 | 5 | TYZOR LA, 1.0 | Dried | 0 | 33 |
| 57 | 5 | TYZOR LA, 2.0 | Baked | 0 | 39 |
| 58 | 5 | TYZOR LA, 2.0 | Dried | 0 | 43 |
| 59 | 1 | TYZOR 131, 5 | Baked | 0 | 38 |
| 60 | 1 | TYZOR 131, 5 | Baked | 2 | 80 |
| 61 | 1 | TYZOR 131, 5 | Baked | 4 | 119 |
| 62 | 1 | TYZOR 131, 5 | Baked | 8 | 99 |
| 63 | 5 | TYZOR 131, 5 | Baked | 0 | 50 |
| 64 | 5 | TYZOR 131, 5 | Baked | 2 | 97 |
| 65 | 5 | TYZOR 131, 5 | Baked | 4 | 97 |
| 66 | 5 | TYZOR 131, 5 | Baked | 8 | 125 |
| 67 | 9 | TYZOR 131, 5 | Baked | 0 | 50 |
| 68 | 9 | TYZOR 131, 5 | Baked | 2 | 81 |
| 69 | 9 | TYZOR 131, 5 | Baked | 4 | 103 |
| 70 | 9 | TYZOR 131, 5 | Baked | 8 | 128 |
| 71 | 13 | TYZOR 131, 5 | Baked | 0 | 38 |
| 72 | 13 | TYZOR 131, 5 | Baked | 2 | 74 |
| 73 | 13 | TYZOR 131, 5 | Baked | 4 | 100 |
| 74 | 13 | TYZOR 131, 5 | Baked | 8 | 97 |
| 75 | 16 | TYZOR 131, 5 | Baked | 0 | 29 |
| 76 | 16 | TYZOR 131, 5 | Baked | 2 | 47 |
| 77 | 16 | TYZOR 131, 5 | Baked | 4 | 25 |
| 78 | 16 | TYZOR 131, 5 | Baked | 8 | 67 |
| 79 | 9 | FOMREZ-UL-1, 1 | Baked | 0 | 51 |
| 80 | 9 | FOMREZ UL-1, 1 | Dried | 0 | 39 |
| 81 | 9 | FOMREZ UL-22, 1 | Baked | 0 | 53 |
| 82 | 9 | FOMREZ UL-22, 1 | Dried | 0 | 48 |
| 83 | 9 | FOMREZ UL-32, 1 | Baked | 0 | 49 |
| 84 | 9 | FOMREZ UL-32, 1 | Dried | 0 | 41 |
| 85 | 9 | PE-1013, 1 | Baked | 0 | 30 |
| 86 | 9 | PE-1013, 1 | Dried | 0 | 22 |
| XXVIII | VII | None, 0 | Baked | 0 | 5 |
| XXIX | VII | None, 0 | Dried | 0 | 8 |
| XXX | VIII | TYZOR 131, 2 | Baked | 0 | 7 |
| XXXI | VIII | TYZOR 131, 2 | Dried | 0 | 7 |
| XXXII | VIII | TYZOR LA, 2 | Baked | 0 | 7 |
| XXXIII | VIII | TYZOR LA, 2 | Dried | 0 | 9 |
| XXXIV | 1 | None | Baked | 0 | 22 |
| XXXV | 5 | None | Baked | 0 | 27 |
| XXXVI | 9 | None | Baked | 0 | 19 |
| XXXVII | 16 | None | Baked | 0 | 12 |
| XXXVIII | 2 | None | Baked | 0 | 8 |
| XXXIX | 6 | None | Baked | 0 | 17 |
| XL | 10 | None | Baked | 0 | 14 |
| XLI | 14 | None | Baked | 0 | 14 |
| XLII | 17 | None | Baked | 0 | 7 |
| XLIII | II | None | Baked | 0 | 31 |
| XLIV | 5 | None | Baked | 0 | 7 |
| XLV | 5 | None | Dried | 0 | 7 |

Examples 87–91

Adhesion Characteristics

The adhesion of the cured films improved as the concentration of the catalyst of the present invention was increased, as shown in Table VII. The adhesion of the cured films of the composition of the present invention was determined by the NMP paint adhesion test, as described above. As the amount of TYZOR LA catalyst was increased from 0.05 to 2.0 weight percent, the NMP adhesion improved from 5.6 to 56 minutes, respectively, as shown in Examples 88–91.

TABLE VII

Data on paint adhesion of films

| Example No. | Silylated Polymer Example No. | Catalyst, % | NMP Paint Adhesion, mins. |
|---|---|---|---|
| 87 | 7 | TYZOR 131, 0.05 | 5.5 |
| 88 | 7 | TYZOR LA, 0.05 | 5.6 |
| 89 | 7 | TYZOR LA, 0.5 | 18 |
| 90 | 7 | TYZOR LA, 1.0 | 39 |
| 91 | 7 | TYZOR LA, 2.0 | 56 |

Examples 92–93
Properties Obtained with Organotin Catalysts

The superior properties obtained employing organotin compounds as the catalyst were determined as follows. As a control, vinyl acrylic latexes were prepared admixed with organotin catalyst (dibutyltin dimercaptide, FOMREZ UL-22, Witco, or dibutyltin bis (1-thioglycerol), PE-1013, Elf Atochem), and the storage time and coating properties were determined. The properties determined for these preparations are set forth in Tables VIII–X.

Formulations were also prepared of the vinyl acrylic latex silylated with 4 mole % of either 3-methacryloxypropyltriisopropoxysilane, or vinyltris (isopropoxy)silane, and containing 1 wt. % of either dibutyltin dimercaptide or dibutyltin bis(1-thioglycerol). The viscosity and pH values of these formulations were measured over time, to provide a means of assessing and comparing the storage stability of the uncured formulations. The formulations were also cured into films, in accordance with the techniques described in the preceding examples, and the film properties were measured. The properties of the uncured and cured formulations are set forth in Tables XI–XVI.

TABLE VIII

Viscosity and pH values of control vinyl acrylic latexes admixed with 1% organotin catalysts vs. the storage time of the admixtures[1]

| Silylated Latex | Testing Performed Storage Time | | | | | |
|---|---|---|---|---|---|---|
| | 0 | 2 Wks | 4.Wks | 8 Wks | 11 Wks | 19 Wks |
| With 1% Fomrez ® UL-22: | | | | | | |
| Viscosity (cps) | 400 | 580 | 560 | 340 | 1800 | 980 |
| pH | 7.0 | 6.0 | 6.5 | 6.9 | 6.8 | 6.4 |
| With 1% PE-1013: | | | | | | |
| Viscosity (cps) | 360 | 660 | 880 | 390 | 2000 | 1050 |
| pH | 7.5 | 6.0 | 6.5 | 7.0 | 6.8 | 6.7 |

[1]The admixtures of control vinyl acrylic latexes with catalysts were stored at room temperature. At a determined time, portions of these latexes were taken in preparing the films.

TABLE IX

Coating properties of control vinyl acrylic latex films admixed with 1% UL-22 organotin catalyst vs. the storage time of the admixtures[1]

| Silylated Latex | Testing Performed Storage Time | | | | |
|---|---|---|---|---|---|
| | 0 Wk | 2 Wks | 4 Wks | 8 Wks | 21 Wks |
| 1% Emulsified UL-22 Catalyst - Cured at RT: | | | | | |
| Gloss (60°) | 77 | 73 | 81 | 84 | 76 |
| Pencil Hardness | 3B | 3B | 3B | 5B | 6B |
| Tape Adhesion | 1B | 4B | 4B | 3B | 2B |
| MEK Rubs | 14 | 25 | 29 | 23 | 17 |
| Cured at 121° C.: | | | | | |
| Gloss (60°) | 86 | 85 | 86 | 85 | 69 |
| Pencil Hardness | 2B | 3B | 4B | 4B | 6B |
| Tape Adhesion | 5B | 5B | 4B | 4B | 3B |
| MEK Rubs | 15 | 34 | 30 | 32 | 18 |

[1]The admixtures of control vinyl acrylic latex with catalysts were stored at room temperature. At a determined time, portions of these latexes were taken in preparing the films. MEK resistance of the coatings was conducted according to ASTM D4752-87. The film thickness was 2 mils. The values were determined by averaging three data points tested on the same steel panels. Coatings were cured at 23° C. and 50% RH for 7 days, or were baked at 121° C. for 20 minutes and further cured at 23° C. and 50% RH for 7 days.

TABLE X

Coating properties of control vinyl acrylic latex films admixed with 1% PE-1013 organotin catalyst vs. the storage time of the admixtures[1]

| Silylated Latex | Testing Performed Storage Time | | | | |
|---|---|---|---|---|---|
| | 0 Wk | 2 Wks | 4 Wks | 8 Wks | 21 Wks |
| 1% Emulsified PE-1013 Catalyst - Cured at RT: | | | | | |
| Gloss (60°) | 89 | 85 | 88 | 92 | 73 |
| Pencil Hardness | 3B | 3B | 3B | 4B | 6B |
| Tape Adhesion | 0B | 0B | 0B | 0B | 0B |

TABLE X-continued

Coating properties of control vinyl acrylic latex films admixed with 1% PE-1013 organotin catalyst vs. the storage time of the admixtures[1]

| Silylated Latex | Testing Performed Storage Time | | | | |
|---|---|---|---|---|---|
| | 0 Wk | 2 Wks | 4 Wks | 8 Wks | 21 Wks |
| MEK Rubs | 10 | 24 | 25 | 18 | 11 |
| Cured at 121° C.: | | | | | |
| Gloss (60°) | 85 | 87 | 88 | 89 | 77 |
| Pencil Hardness | 3B | 3B | 4B | 4B | 6B |
| Tape Adhesion | 5B | 5B | 3B | 3B | 0B |
| MEK Rubs | 10 | 26 | 30 | 28 | 14 |

[1]The admixtures of control vinyl acrylic latex with catalysts were stored at room temperature. At a determined time, portions of these latexes were taken in preparing the films. MEK resistance of the coatings was conducted according to ASTM D4752-87. The film thickness was 2 mils. The values were determined by averaging three data points tested on the same steel panels. Coatings were cured at 23° C. and 50% RH for 7 days, or were baked at 121° C. for 20 minutes and further cured at 23° C. and 50% RH for 7 days.

TABLE XI

Viscosity and pH values of 4 mole % 3-methacryloxypropyl-triisopropoxysilane silylated vinyl acrylic latexes with 1% organotin catalysts vs. the storage time of the admixtures[1]

| Silylated Latex | Testing Performed Storage Time | | | | | |
|---|---|---|---|---|---|---|
| | 0 | 2 Wks | 4.Wks | 8 Wks | 11 Wks | 19 Wks |
| With 1% Fomrez ® UL-22: | | | | | | |
| Viscosity (cps) | 1800 | 1460 | 1280 | 1300 | 2400 | 2380 |
| pH | 7.5 | 6.5 | 6.5 | 6.6 | 6.4 | 6.2 |
| With 1% PE-1013: | | | | | | |
| Viscosity (cps) | 1840 | 1660 | 1400 | 1280 | 2400 | 2310 |
| pH | 7.5 | 6.5 | 6.5 | 6.8 | 6.5 | 6.6 |

[1]Effects of organotin emulsion (1%) catalysts were studied. The admixtures of silylated vinyl acrylic latexes with catalysts were stored at room temperature. At a determined time, portions of these latexes were taken in preparing the films.

TABLE XII

Coating properties of 4 mole % 3-methacryloxypropyl-triisopropoxysilane silylated vinyl acrylic latex films cured with 1% UL-22 organotin catalyst vs. the storage time of the admixtures[1]

| Silylated Latex | Testing Performed Storage Time | | | | | |
|---|---|---|---|---|---|---|
| | 0 Wk | 2 Wks | 4 Wks | 8 Wks | 21 Wks | 29 Wks |
| 1% Emulsified UL-22 Catalyst - Cured at RT: | | | | | | |
| Gloss (60°) | 66 | 60 | 58 | 63 | 59 | — |
| Pencil Hardness | 3B | 3B | 4B | 4B | 5B | — |
| Tape Adhesion | 5B | 5B | 5B | 5B | 5B | — |
| MEK Rubs | 76 | 82 | 74 | 83 | 60 | — |
| Cured at 121° C.: | | | | | | |
| Gloss (60°) | 56 | 74 | 74 | 79 | 65 | — |
| Pencil Hardness | 3B | 3B | 4B | 4B | 5B | 5B |
| Tape Adhesion | 5B | 5B | 5B | 5B | 5B | 5B |
| MEK Rubs | 84 | 106 | 120 | 132 | 78 | 46 |

[1]The admixtures of silylated vinyl acrylic latexes with catalysts were stored at room temperature. At a determined time, portions of these latexes were taken in preparing the films. MEK resistance of the coatings was conducted according to ASTM D4752-87. The film thickness was 2 mils. The values were determined by averaging three data points tested on the same steel panels. Coatings were cured at 23° C. and 50% RH for 7 days, or were baked at 121° C. for 20 minutes and further cured at 23° C. and 50% RH for 7 days.

TABLE XIII

Coating properties of 4 mole % 3-methacryloxypropyl-triisopropoxysilane silylated vinyl acrylic latex films cured with 1% PE-1013 organotin catalyst vs. the storage time of the admixtures[1]

| Silylated Latex | Testing Performed Storage Time | | | | | |
|---|---|---|---|---|---|---|
| | 0 Wk | 2 Wks | 4 Wks | 8 Wks | 21 Wks | 29 Wks |
| 1% Emulsified PE-1013 Catalyst - Cured at RT: | | | | | | |
| Gloss (60°) | 70 | 70 | 67 | 66 | 58 | — |
| Pencil Hardness | 4B | 4B | 4B | 5B | 6B | — |
| Tape Adhesion | 5B | 5B | 5B | 5B | 4B | — |
| MEK Rubs | 44 | 77 | 97 | 105 | 63 | — |
| Cured at 121° C.: | | | | | | |
| Gloss (60°) | 84 | 81 | 79 | 82 | 70 | — |
| Pencil Hardness | 4B | 4B | 4B | 4B | 5B | 3B |
| Tape Adhesion | 5B | 5B | 5B | 5B | 4B | 0B |
| MEK Rubs | 62 | 168 | 280 | 301 | 159 | 79 |

[1]The admixtures of silylated vinyl acrylic latexes with catalysts were stored at room temperature. At a determined time, portions of these latexes were taken in preparing the films. MEK resistance of the coatings was conducted according to ASTM D4752-87. The film thickness was 2 mils. The values were determined by averaging three data points tested on the same steel panels. Coatings were cured at 23° C. and 50% RH for 7 days, or were baked at 121° C. for 20 minutes and further cured at 23° C. and 50% RH for 7 days.

TABLE XIV

Viscosity and pH values of 4 mole % vinyl tris(isopropoxy)silane silylated vinyl acrylic latexes with 1% organotin catalysts vs. the storage time of the admixtures[1]

| Silylated Latex | Testing Performed Storage Time | | | | | |
|---|---|---|---|---|---|---|
| | 0 | 2 Wks | 4.Wks | 8 Wks | 11 Wks | 19 Wks |
| With 1% Fomrez ® UL-22: | | | | | | |
| Viscosity (cps) | 2060 | 2560 | 2540 | 6700 | 24600 | 23000 |
| pH | 7.5 | 6.5 | 6.5 | 5.6 | 5.6 | 5.6 |

TABLE XIV-continued

Viscosity and pH values of 4 mole % vinyl tris(isopropoxy)silane silylated vinyl acrylic latexes with 1% organotin catalysts vs. the storage time of the admixtures[1]

| | Testing Performed Storage Time | | | | | |
|---|---|---|---|---|---|---|
| Silylated Latex | 0 | 2 Wks | 4.Wks | 8 Wks | 11 Wks | 19 Wks |
| With 1% PE-1013: | | | | | | |
| Viscosity (cps) | 2200 | 2420 | 2320 | 5250 | 16000 | 15600 |
| pH | 7.5 | 6.5 | 6.5 | 4.1 | 6.1 | 5.9 |

[1]Effects of organotin emulsion (1%) catalysts were studied. The admixtures of silylated vinyl acrylic latexes with catalysts were stored at room temperature. At a determined time, portions of these latexes were taken in preparing the films.

TABLE XV

Coating properties of 4 mole % vinyltris(isopropoxy)silane silylated vinyl acrylic latex films cured with 1% UL-22 organotin catalyst vs. the storage time of the admixtures[1]

| | Testing Performed Storage Time | | | | | |
|---|---|---|---|---|---|---|
| Silylated Latex | 0 Wk | 2 Wks | 4 Wks | 8 Wks | 21 Wks | 29 Wks |
| 1% Emulsified UL-22 Catalyst - Cured at RT: | | | | | | |
| Gloss (60°) | 78 | 70 | 62 | 65 | 62 | — |
| Pencil Hardness | 3B | 3B | 3B | 3B | 4B | — |
| Tape Adhesion | 5B | 5B | 5B | 5B | 5B | — |
| MEK Rubs | 28 | 65 | 117 | 108 | 79 | — |
| Cured at 121° C.: | | | | | | |
| Gloss (60°) | 84 | 76 | 64 | 65 | 64 | — |
| Pencil Hardness | 3B | 3B | 3B | 2B | 3B | 4B |
| Tape Adhesion | 5B | 5B | 5B | 5B | 5B | 5B |
| MEK Rubs | 72 | 96 | 147 | 139 | 86 | 63 |

[1]The admixtures of silylated vinyl acrylic latexes with catalysts were stored at room temperature. At a determined time, portions of these latexes were taken in preparing the films. MEK resistance of the coatings was conducted according to ASTM D4752-87. The film thickness was 2 mils. The values were determined by averaging three data points tested on the same steel panels. Coatings were cured at 23° C. and 50% RH for 7 days, or were baked at 121° C. for 20 minutes and further cured at 23° C. and 50% RH for 7 days.

TABLE XVI

Coating properties of 4 mole % vinyltris(isopropoxy)silane silylated vinyl acrylic latex films cured with 1% PE-1013 organotin catalyst vs. the storage time of the admixtures[1]

| | Testing Performed Storage Time | | | | | |
|---|---|---|---|---|---|---|
| Silylated Latex | 0 Wk | 2 Wks | 4 Wks | 8 Wks | 21 Wks | 29 Wks |
| 1% Emulsified PE-1013 Catalyst - Cured at RT: | | | | | | |
| Gloss (60°) | 85 | 76 | 57 | 61 | 56 | — |
| Pencil Hardness | 4B | 4B | 5B | 5B | 6B | — |
| Tape Adhesion | 5B | 5B | 5B | 5B | 4B | — |
| MEK Rubs | 30 | 116 | 212 | 206 | 137 | — |
| Cured at 121° C.: | | | | | | |
| Gloss (60°) | 86 | 84 | 82 | 81 | 70 | — |
| Pencil Hardness | 4B | 4B | 4B | 3B | 5B | 5B |
| Tape Adhesion | 5B | 5B | 5B | 5B | 4B | 5B |
| MEK Rubs | 52 | 106 | 224 | 223 | 160 | 41 |

[1]The admixtures of silylated vinyl acrylic latexes with catalysts were stored at room temperature. At a determined time, portions of these latexes were taken in preparing the films. MEK resistance of the coatings was conducted according to ASTM D4752-87. The film thickness was 2 mils. The values were determined by averaging three data points tested on the same steel panels. Coatings were cured at 23° C. and 50% RH for 7 days, or were baked at 121° C. for 20 minutes and further cured at 23° C. and 50% RH for 7 days.

The properties reported in Tables XI–XVI establish that the organotin catalysts provide better storage stability and a greater degree of cure than other catalysts. This means that a greater degree of cure can be obtained for a given amount of catalyst with the formulations of the present invention, and that less silane is needed to obtain a given degree of crosslinking when one uses a catalyst of the present invention. Thus, whereas silane levels of even up to 1% had in the past been associated with instability due to an excessive tendency to crosslink, it is possible now with the catalyst systems of the present invention to include higher levels of silane, even up to 10%, without onset of instability and thus achieving superior performance of the overall product.

We claim:

1. A curable composition comprising:
   (a) a stable, water dispersible, curable polymer containing a sterically hindered alkoxylated silane group at 0.1 to 75 weight percent of the total composition;
   (b) water dispersible or water soluble, hydrolytically stable organotin catalyst, at 0.1 to 10 weight percent of the total composition; and
   (c) water at 99.8 to 24.9 weight percent of the total composition.

2. A composition according to claim 1 wherein the catalyst has the formula $R_2Sn(SCH_2COO)$, $R_2Sn(SS)$, $R_2Sn(SCH_2COOR^A)_2$, $RSn(SCH_2COOR^A)_3$, $R_2Sn=S$, or

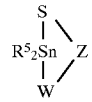

where each R is alkyl containing 1 to 12 carbon atoms, each $R^A$ is hydrogen or alkyl containing 1 to 12 carbon atoms, $R^5$ is alkyl or aryl containing 1–8 carbon atoms; W is —S— or —O—; and Z is —$CH_2CH(CH_2OH)$— or —$CH_2CH(OH)CH_2$—.

3. A composition according to claim 1 wherein the catalyst is dibutyltin oxide.

4. A composition according to claim 1 wherein the catalyst is dibutyltin dimercaptide.

5. A composition according to claim 1 wherein the catalyst is dibutyltin bis(1-thioglycerol).

6. A composition according to claim 1 wherein the composition has a shelf life of at least twelve months.

7. A composition according to claim 1 additionally comprising a buffer in an amount sufficient to maintain the pH of the composition at between 5.5 and 8.5.

8. A film produced by curing of the composition of claim 1.

9. A composition according to claim 1 wherein the water dispersible or emulsifiable, curable polymers have a pendant or terminal silane group of the structure $R^3SiR^2a(OR')_{3-a}$, where $R^1$ is a sterically hindered $C_3$ to $C_{10}$ alkyl group in straight or branched chain configuration; $R^2$ is a monovalent hydrocarbon group having from one to ten carbon atoms; $R^3$ is an alkylene, arylene, aryalkylene group or the polymer backbone itself, with the proviso that the $SiR^3$ is bound to the polymer through an Si—C bond; and a has a value of zero, one or two.

10. A composition according to claim 9 wherein $R^1$ has less than five carbon atoms and is branched.

11. A composition according to claim 10 wherein $R^1$ is selected from the group consisting of: iso-butyl, sec-butyl, isopropyl and sec-amyl.

12. A composition according to claim 1 wherein the water dispersible or emulsifiable curable polymer is a silylated vinyl acrylic polymer with a molecular weight between 1,000 and three million.

13. A process for making a curable composition comprising mixing:
(a) a stable, water dispersible, curable polymer containing a sterically hindered alkoxylated silane group at 0.1 to 75 weight percent of the total composition;
(b) water dispersible or water soluble hydrolytically stable organotin catalyst, at 0.1 to 10 weight percent of the total composition; and
(c) water at 99.8 to 24.9 weight percent.

14. A process according to claim 13 wherein the catalyst has the formula $R_2Sn(SCH_2COO)$, $R_2Sn(SS)$, $R_2Sn(SCH_2COOR^4)_2$, $RSn(SCH_2COOR^4)_3$, $R_2Sn=S$, or

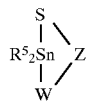

where each R is alkyl containing 1 to 12 carbon atoms, each $R^4$ is hydrogen or alkyl containing 1 to 12 carbon atoms, $R^5$ is alkyl or aryl containing 1–8 carbon atoms; W is —S— or —O—; and Z is —$CH_2CH(CH_2OH)$— or —$CH_2CH(OH)CH_2$—.

15. A process according to claim 13 wherein the catalyst is dibutyltin oxide.

16. A process according to claim 13 wherein the catalyst is dibutyltin dimercaptide.

17. A process according to claim 13 wherein the catalyst is dibutyltin bis(1-thioglycerol).

18. A process according to claim 13 wherein the curable composition has a shelf life of at least twelve months.

19. A process according to claim 13 additionally comprising adding buffer in an amount sufficient to maintain the pH of the composition at between 5.5 and 8.5.

20. A process according to claim 13 additionally comprising curing the curable composition.

21. A process according to claim 13 wherein the water dispersible or emulsifiable, curable polymers have a pendant or terminal silane group of the structure $R^3SiR^2_a(OR')_{3-a}$, where $R^1$ is a sterically hindered $C_3$ to $C_{10}$ alkyl group in straight or branched chain configuration; $R^2$ is a monovalent hydrocarbon group having from one to ten carbon atoms; $R^3$ is an alkylene, arylene, aryalkylene group or the polymer backbone itself, with the proviso that the $SiR^3$ is bound to the polymer through an Si—C bond; and a has a value of zero, one or two.

22. A process according to claim 21 wherein $R^1$ has less than five carbons and is branched.

23. A process according to claim 21 wherein $R^1$ is selected from the group consisting of: iso-butyl, sec-butyl, iso-propyl and sec-amyl.

24. A process according to claim 13 wherein the water dispersible or emulsifiable curable polymer is a silylated vinyl acrylic polymer with a molecular weight between 1,000 and three million.

* * * * *